(12) United States Patent
Paulsen et al.

(10) Patent No.: US 11,522,186 B2
(45) Date of Patent: Dec. 6, 2022

(54) POSITIVE ELECTRODE MATERIAL FOR RECHARGEABLE LITHIUM ION BATTERIES

(71) Applicants: UMICORE, Brussels (BE); UMICORE KOREA LTD., Cheonan-si (KR)

(72) Inventors: Jens Paulsen, Cheonan-si (KR); HyeJeong Yang, Cheonan-si (KR); JiHye Kim, Cheonan-si (KR)

(73) Assignees: UMICORE, Brussels (BE); UMICORE KOREA, LTD., Cheonan-si (KR)

( * ) Notice: Subject to any disclaimer, the term of this patent is extended or adjusted under 35 U.S.C. 154(b) by 266 days.

(21) Appl. No.: 16/909,179

(22) Filed: Jun. 23, 2020

(65) Prior Publication Data

US 2020/0358096 A1 Nov. 12, 2020

Related U.S. Application Data

(63) Continuation-in-part of application No. 16/956,025, filed as application No. PCT/EP2018/083406 on Dec. 4, 2018.

(30) Foreign Application Priority Data

Dec. 22, 2017 (EP) .................................... 17209955

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/42* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

2017/0133668 A1 5/2017 Kim et al.
2018/0013129 A1 1/2018 Lee et al.
2018/0351174 A1 12/2018 Paulsen et al.

FOREIGN PATENT DOCUMENTS

CN 107408667 A 11/2017
EP 3249723 A1 11/2017
(Continued)

OTHER PUBLICATIONS

"International Standard ISO 2533: Standard Atmosphere", International Organization for Standardization, Ref No. ISO 2533-1975 (E), May 15, 1975, 15 pages.
(Continued)

*Primary Examiner* — Carlos Barcena
(74) *Attorney, Agent, or Firm* — NK Patent Law

(57) ABSTRACT

A positive electrode active material for a lithium ion battery comprises a lithium transition metal-based oxide powder, the powder comprising single crystal monolithic particles comprising Ni and Co and having a general formula $Li_{1+a}(Ni_z Mn_y Co_x Zr_q A_k)_{1-a} O_2$, wherein A is a dopant, $-0.025 \leq a < 0.005$, $0.60 \leq z \leq 0.95$, $y \leq 0.20$, $0.05 \leq x \leq 0.20$, $k \leq 0.20$, $0 \leq q \leq 0.10$, and $x+y+z+k+q=1$. The particles have a cobalt concentration gradient wherein the particle surface has a higher Co content than the particle center.

7 Claims, 6 Drawing Sheets

(51) Int. Cl.
*H01M 10/0525* (2010.01)
*C01G 53/00* (2006.01)
*H01M 4/02* (2006.01)

(52) U.S. Cl.
CPC ..... *H01M 10/0525* (2013.01); *C01P 2002/54* (2013.01); *C01P 2002/85* (2013.01); *C01P 2004/03* (2013.01); *C01P 2004/20* (2013.01); *C01P 2004/54* (2013.01); *C01P 2004/84* (2013.01); *C01P 2006/40* (2013.01); *H01M 2004/021* (2013.01); *H01M 2004/028* (2013.01)

(56) References Cited

FOREIGN PATENT DOCUMENTS

| | | | |
|---|---|---|---|
| JP | 2006054159 | A | 2/2006 |
| JP | 2009544565 | A | 12/2009 |
| WO | 2013002559 | A2 | 1/2013 |
| WO | 2016116867 | A1 | 7/2016 |
| WO | 2017042654 | A1 | 3/2017 |
| WO | 2017095153 | A1 | 6/2017 |

OTHER PUBLICATIONS

"OLME An HKEX Company: Special Contract Rules for Copper Grade A", The London Metal Exchange, accessed at: https://www.inducorp.co.in/assets/pdf/copper.pdf, 2016, 4 pages.

ISA/EP; International Search Report and Written Opinion for International Patent Application No. PCT/EP2018/083406 dated Mar. 15, 2019, 11 pages.

WIPO; International Preliminary Report on Patentability for International Patent Application No. PCT/EP2018/083406 dated Jan. 8, 2020, 8 pages.

Hyung-Joo Noh et al., "Formation of a Continuous Solid-Solution Particle and its Application to Rechargeable Lithium Batteries", Advanced Functional Materials, vol. 23, No. 18, Feb. 25, 2013, pp. 1028-1036.

USPTO; Non-Final Office Action for U.S. Appl. No. 16/956,025 dated May 16, 2022, 6 pages.

POSITIVE ELECTRODE MATERIAL FOR RECHARGEABLE LITHIUM ION BATTERIES

CROSS-REFERENCE TO RELATED APPLICATIONS

This application is a Continuation-in-Part application of U.S. application Ser. No. 16/956,025, filed Jun. 19, 2020, which is a U.S. National Stage application of International Patent Application No. PCT/EP2018/083406, filed on Dec. 4, 2018, which claims the benefit of European Patent Application No. 17209955.8, filed on Dec. 22, 2017.

TECHNICAL FIELD AND BACKGROUND

This invention relates to a lithium transition metal oxide material with monolithic morphology that can be applied as a positive electrode active material for rechargeable lithium ion batteries. More particularly, the material comprises particles having a gradient of cobalt concentration from the particle surface to the particle center. The positive electrode active material enhances battery performance, such as capacity, cycle stability and rate capability. Moreover, the material can be used in solid state lithium ion batteries or non-aqueous lithium ion batteries at a high voltage due to its special morphology.

A positive electrode active material is defined as a material which is electrochemically active when embedded in a positive electrode. By active material, it is understood as a material capable of capturing and releasing Li ions when subjected to a voltage change over a predetermined period of time.

Rechargeable lithium ion batteries (LIBs) are currently used for laptops, cell phones, cameras and a variety of other electronic devices due to their high volumetric and gravimetric energy density, and long cycle life. Furthermore, to meet the needs for large batteries for electric vehicles (EVs) and hybrid electric vehicles (HEVs), higher energy density batteries are required. One way to increase the energy density of a battery is by applying a higher working voltage. However, the organic liquid electrolyte used in conventional lithium ion batteries decomposes during cycling at high voltage and forms side products. Besides of the stability problem, electrolytes contain flammable solvents, which can cause thermal runaway at high charging levels. As a result, serious safety issues such as high risk of electrolyte leakage, overheating and burning can occur. Considering future EV and HEV applications, safety is one of the top concerns.

Solid electrolytes, replacing the flammable liquid-organic electrolytes, have opened the field of solid state batteries (SSBs). Solid electrolytes not only provide increased safety, but also provide excellent cycle stability. These properties make them also attractive for high voltage applications. Previously SSB technology was driven by thin film battery technologies for portable applications. In general, layered oxide materials as positive electrode materials, especially $LiCoO_2$ (LCO), are preferred (e.g. for thin film batteries). An LCO possesses sufficiently high theoretical capacity with good thermal stability. However, due to resource scarcity causing high prices of cobalt (Co) and environmental issues, new positive electrode materials possessing a stable 2D layer structure with high theoretical capacity are being developed. Using LCO as a starting point, by metal substitution, i.e. replacing Co by other transition metals, $LiNi_xM-n_yCo_zO_2$ (NMC) and $LiNi_xCo_yAl_zO_2$(NCA) have been discovered by adjusting the composition of ternary layer oxide materials $Li_{1+a}M_{1-a}O_2$, where M is a mixture of nickel (Ni), cobalt (Co), manganese (Mn) or aluminum (Al), with a being typically near zero. These materials are popular since the combination of Ni, Mn, Co and Al offers advantages based on the fact that Ni delivers high capacity while Mn provides a good cyclic performance. Moreover, Co supports the layered crystal structure of NMC so that Li ions can be quickly transported. Al doping is also known as a way to improve safety.

In conventional LIBs, a polycrystalline NMC having open interconnected porosities is preferred because the liquid electrolyte can easily penetrate into the porous structure. This is useful since the much higher lithium conductivity of the electrolyte creates "highways" for a fast lithium diffusion in to and out of the particles. However, a porous structure is not beneficial for SSBs since a solid electrolyte cannot enter into the pores. Therefore, a non-porous morphology is needed. Furthermore, SSBs requires a good interfacial contact between a solid electrolyte and the positive electrode particles, which can be achieved especially when the particles have, for example, a spherical or near spherical morphology. This contact is then achieved by pressing a solid electrolyte onto a powderous positive electrode material. It follows that the positive electrode powder is required to be mechanically robust. If polycrystalline (porous) NMC is used in SSBs, the interfacial contact between solids may be damaged or cracks are formed when compressing the electrode as part of the battery manufacturing process. Cracking is also a more general concern: during charge-discharge, particles experience volume changes induced by strain, as described in A. C. Luntz et al in J. Phys. Chem. Lett., 2015, 6 (22). This volume change can delaminate the interface between electrode and electrolyte, resulting in additional cracks. The peeling and cracking leads to disconnection of lithium ionic pathways, and consequently causes a rapid capacity loss. These problems are less severe in the case of conventional batteries because they contain liquid electrolytes and somehow flexible electrodes, and therefore particles can be still electrically active after cracking, since the system is more tolerant to this deformation. But when applying high voltage cycling this flexibility might not be sufficient to absorb the repeated volume changes. Similarly, since SSBs have no buffer and a binder to withstand such cracks, it would be problematic in a real battery.

In US2017/133668 A1, a polycrystalline positive electrode material having a core part and a surface part is disclosed, where an amount of manganese in the core part and the surface part is higher than 25 mol %, and amounts of nickel and cobalt in the positive electrode active material vary such that a concentration gradient of the nickel and the cobalt in a direction from the core part to the surface part is present in the positive electrode active material.

CN107408667 provides a method to make a positive electrode active material which includes a core, a shell disposed aound the core, and a buffer layer between the core and the shell, the buffer layer including pores and a three-dimensional network structure connecting the core and the shell, wherein the core, the shell, and the three-dimensional network structure of the buffer layer each independently include a lithium nickel manganese cobalt-based composite metal oxide and at least one metallic element of the nickel, the manganese, and the cobalt has a concentration gradient that gradually changes in any one region of the core, the shell, and the entire positive electrode active material.

WO2017/042654 discloses a method for manufacturing a positive electrode material having a general formula $Li_{1-a'}$ $((Ni_z (Ni_{1/2} Mn_{1/2})_y Co_x)_{1-k} A_k)_{1+a'} O_2$, wherein $x+y+z=1$, $0.1 \leq x \leq 0.4$, $0.25 \leq z \leq 0.55$, A is a dopant, $0 \leq k \leq 0.1$, and $0.01 \leq a' \leq 0.10$, by a multiple sintering step process.

It is an object of the present invention to provide a novel positive electrode material powder that is especially adapted for SSBs or non-aqueous batteries functioning at high voltage without having the disadvantages of known monolithic LCO and polycrystalline NMC materials, and in particular being mechanically robust to withstand continuous volume changes and crack formation.

Another object of the present invention is to provide a novel positive electrode material powder that shows the above-provided advantages and a DQ1 of at least 199 mAh/g, as measured according to the analytical methods described in the present invention. Such a material is illustrated by the following examples according to the invention:

| Example ID | Added Co in step 4) (mol %) | Added Co in step 5) (mol %) | Added Li in step 5) (mol %) | Added Zr in step 5) (mol %) | Li/M' | a | DQ1 (mAh/g) |
|---|---|---|---|---|---|---|---|
| EX2A | 0.5 | 1.5 | 4.5 | 0.00 | 0.960 | −0.020 | 199.7 |
| EX2B | 0.5 | 1.5 | 6.0 | 0.00 | 0.975 | −0.013 | 202.7 |
| EX2C | 0.5 | 1.5 | 7.5 | 0.00 | 0.990 | −0.005 | 199.3 |
| EX2D | 0.5 | 1.5 | 9.0 | 0.00 | 1.005 | 0.002 | 199.0 |
| EX3 | 0.5 | 1.5 | 7.5 | 0.25 | 0.990 | −0.005 | 201.7 |

SUMMARY

Viewed from a first aspect, the invention can provide a positive electrode active material for a lithium ion battery, comprising a lithium transition metal-based oxide powder, the powder comprising single crystal monolithic particles, said particles having a particle surface and a particle center and comprising Ni and Co and having a general formula $Li_{1+a} (Ni_z Mn_y Co_x Zr_q A_k)_{1-a} O_2$, wherein A is a dopant, $-0.025 \leq a < 0.005$, $0.60 \leq z \leq 0.95$, $y \leq 0.20$, $0.05 \leq x \leq 0.20$, $k \leq 0.20$, $0 \leq q \leq 0.10$, preferably $\leq 0.05$, more preferably $\leq 0.0025$, and $x+y+z+k+q=1$, the particles having a cobalt concentration gradient wherein the particle surface has a higher Co content than the particle center and wherein either
- when Mn is present, the ratio between the Co/Mn molar ratio at the particle surface and the Co/Mn molar ratio at a distance d from the surface is between 1.1 and 1.4, whereby d=¼ of the distance from the particle surface to the particle center, or
- when Mn is absent, the ratio between C(4)/C(3) is between 1.1 and 1.4, wherein C(4) is the Co/(Ni+Co) molar ratio at the particle surface and C(3) is the Co/(Ni+Co) molar ratio at a distance d from the surface, whereby either d=¼ or d=¾ of the distance from the particle surface to the particle center.

In one embodiment, and the single crystal monolithic particles have a Zr concentration gradient from the surface to the core, wherein the particle surface has a higher Zr content than the particle center.

In one embodiment Mn is absent and the general formula is $Li_{1+a'} (Ni_{z'} Co_{x'} A_{k'})_{1-a'} O_2$, wherein A is a dopant, $-0.025 < a' \leq 0.005$, $0.70 \leq z' \leq 0.90$, $0.05 \leq x' \leq 0.30$, $k' \leq 0.02$, and $x'+z'+k'=1$.

In one embodiment the dopant A is either one or more of Al, Ca, W, B, Si, Ti, Mg, W, S, Ba, Sr, and Zr. Dopants may improve structural and thermal stability or enhance the lithium ionic conductivity. Additionally, oxygen in the general formula may be partly replaced by S, F or N. The dopant is generally homogeneously distributed in a core or center.

A source of dopant can be added in the co-precipitation process or in the blending step together with lithium source. The dopant in a positive electrode active material is identified by a combination of analytical methods such as a combination of an Inductively Coupled Plasma (ICP) method and TEM-EDS (transmission electron microscopy—energy dispersive X-ray spectroscopy). A dopant is detected by ICP in a cathode material powder at a content of at least 100 ppm. The distribution of the doping element in a particle of said powder is obtained by EDS-TEM.

A doping element has a constant average content, as measured by TEM-EDS, between two location points in a line defining a shortest distance between a point at the particle surface and another point at the particle center.

In an embodiment of the present invention, Zr can have a constant content from a point at the center of a particle and a third point located in the line defining a shortest distance between the point at the particle surface and the point at the particle center, and can have a Zr concentration gradient from the point at the particle surface to said third point, wherein the content of Zr at the particle surface point is higher than the content of Zr at the third point.

The positive electrode active material may be a powder having a particle size distribution with D50<10 μm, preferably less than 8 μm and more preferably between 2 and 5 μm, wherein D50 is a median particle size.

In an embodiment—when Mn is present—the ratio between the Co/Mn molar ratio at the particle surface and the Co/Mn molar ratio at the particle center is between 1.4 and 1.5. In another embodiment, the cobalt concentration gradient varies continuously from the surface to the center of the particles. The powder may comprise particles having a morphology with multiple flat surfaces and an aspect ratio of at least 0.8. Such a morphology is (quasi) spherical or oval. The surface layer of the positive electrode active material may comprise $LiCoO_2$, where it may also be that Co is partly replaced by the dopant A. Furthermore the particles constituting the powder may be provided with a coating comprising either one or both of $LiNaSO_4$ and $Al_2O_3$.

Viewed from a second aspect, the invention can provide a method for manufacturing the powderous positive electrode material compound described above, comprising Ni and Co and having a general formula $Li_{1+a} (Ni_z Mn_y Co_x Zr_q A_k)_{1-a} O_2$, wherein A is a dopant, $-0.025 < a < 0.005$, $0.60 \leq z \leq 0.95$, $y \leq 0.20$, $0.05 \leq x \leq 0.20$, $k \leq 0.20$, $0 \leq q \leq 0.10$, preferably $0 \leq q \leq 0.050$, more preferably $0 \leq q \leq 0.025$, and $x+y+z+q+k=1$, comprising the steps of:
- providing a first precursor comprising A, Ni and Co, and Mn if present in the powderous positive electrode active material, the precursor consisting of particles having a particle size distribution with a D50<10 μm, wherein D50 is a median particle size,
- mixing the first precursor with either one of LiOH, $Li_2O$, $Li_2CO_3$ and $LiOH.H_2O$, thereby obtaining a first mixture, whereby the Li to transition metal ratio LM1 in the first mixture is between 0.60 and <1.00, sintering the first mixture in an oxidizing atmosphere at a temperature between 700° C. and 900° C., for a time between 6 and 36 hrs, thereby obtaining a first intermediate product, mixing the first intermediate product with either one of LiOH, $Li_2O$, $Li_2CO_3$ and $LiOH.H_2O$ hereby obtaining a second mixture, whereby the Li to transition metal ratio in the second mixture LM2≥0.90, sintering the second mixture in an oxidizing atmosphere at a temperature between $(850-(155.56*z))°$ C. and $(1050-(155.56*z))°$ C., for a time between 6 and 36 hrs, milling the sintered second mixture whereby the sintered second mixture particles are separated in solitary primary particles, providing a Co-based precursor and optionally a Li-based precursor, and optionally a source of Zr, and mixing said precursors with the sintered and milled second mixture, thereby obtaining a third mixture having a Li to transition metal ratio in the third mixture LM3 with $-0.107*z+1.018 \leq LM3 < -0.107*z+1.098$, sintering the third mixture in an oxidizing atmosphere at a temperature between 700° C. and 800° C., for a time between 6 and 36 hrs.

In this embodiment it may be that LM3=LM2, meaning that the Co molar content in the Co-based precursor and the Li molar content in the Li-based precursor are equal, whereby both molar contents are expressed versus the total metal content—except Li—in the second mixture. Here too, it may be that between 2 and 10 mol % of Co is added in the Co-based precursor. In another embodiment, the milling step is applied to break agglomerated powder from the $2^{nd}$ sintering into separate particles in a ball mill equipment.

In an embodiment, the Co-based precursor may be added by a dry blending process or during a dry milling step or during a wet milling step.

In a further embodiment the method described before comprises the subsequent steps of:
providing an inorganic oxidizing chemical compound,
providing a chemical that is a Li-acceptor,
mixing the sintered third mixture, the oxidizing compound and the Li-acceptor, thereby obtaining a fourth mixture, and
heating the fourth mixture at a temperature between 300 and 800° C. in an oxygen comprising atmosphere. In this embodiment, it may be that both the inorganic oxidizing chemical compound and the Li-acceptor chemical are the same compound, being either one of $Li_2S_2O_8$, $H_2S_2O_8$ and $Na_2S_2O_8$, and the heating temperature of the fourth mixture is between 350 and 450° C. It may also be that a nanosized $Al_2O_3$ powder is provided as a further Li-acceptor chemical.

Viewed from a third aspect, the invention can provide the use of the powderous positive electrode material in either a solid state lithium ion battery, or in a lithium ion battery provided with a liquid electrolyte, and being cycled up to a voltage of at least 4.35V.

DETAILED DESCRIPTION

Figure 1:
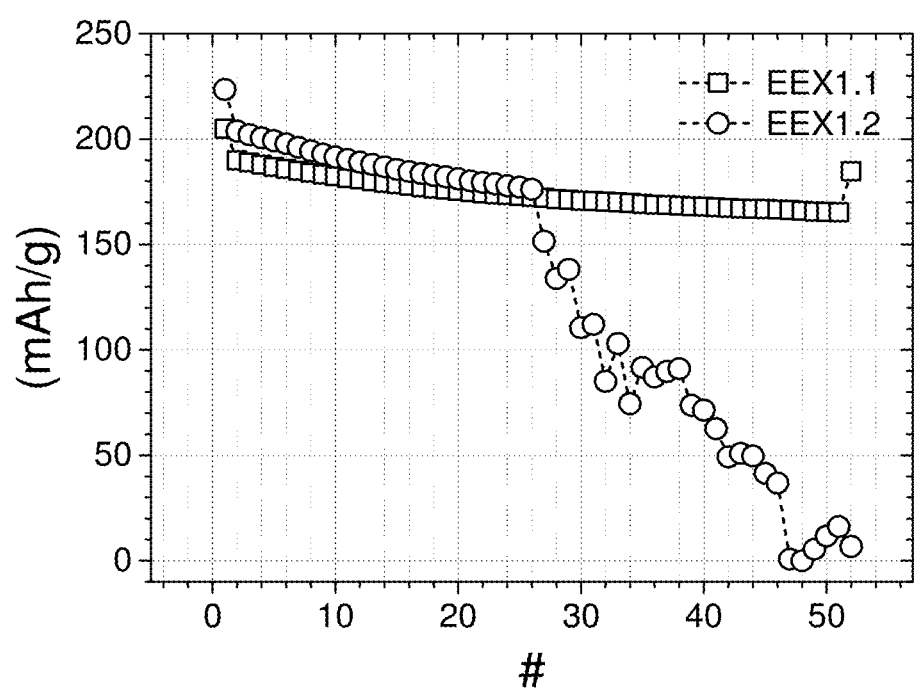
FIG. 1. Discharge capacity of EEX1.1 and EEX1.2 as a function of cycle number.

This invention provides an NMC or an NC(A) powder (further referred to as N(M)C) with a special monolithic morphology that can be used as positive electrode active materials for both SSBs and conventional lithium ion batteries operating at high voltage. As used herein, "Monolithic" refers to a morphology where a secondary particle contains ideally only one primary particle. Other expressions of the word "monolithic material" are single crystal material, mono-crystal material, and one-body material. The preferred shape of the primary particle could be described as pebble stone shape wherein the aspect ratio of the primary particles is generally near 1.

One way to overcome or improve crack formation in battery applications is to avoid polycrystalline materials. Therefore, replacing them by N(M)C materials which have a morphology of single particles seems promising since higher energy densities can be achieved, and since when batteries are cycled at a high voltage (to achieve higher capacities, such as for electric vehicle (EV) applications), fading mechanisms related to more pronounced volume changes and induced particle cracking are eliminated. The cross-sectional images of positive electrodes before and after cycling show that a monolithic N(M)C does not crack after cycling under high voltage, indicating it possesses excellent mechanical strength. It is thus observed that the monolithic N(M)C has a much better cycle stability at a high voltage and high temperature than a polycrystalline N(M)C.

In SSBs, the monolithic morphology provides good contact between the solid state electrolyte and the positive electrode material during cell packing and cycling, since it has a quasi spherical shape with flat areas providing a face to face contact—rather than a point to point contact. Therefore, distortion through grain boundaries as well as the formation of micro-cracks will be avoided during cycling. Furthermore, with regard to the unwanted side reactions occurring at the interface between electrolyte and solid positive electrode, as monolithic particles have a small surface, these undesired reactions can be limited. As a result, cycle stability can be enhanced and irreversible capacity loss can be prevented.

The monolithic particles preferably have a particle size distribution with a D50 of less than 10 μm, preferably less than 8 μm, and more preferably between 2 and 5 μm. When the median particle size (D50) is more than 10 μm, the battery performance may be worsening, leading to a lower capacity and higher irreversibility. If on the contrary the median particle size is too small (i.e. <2 μm), the N(M)C powder is difficult to prepare using state of the art processes. For example, the powder cannot be sieved easily because of particle agglomeration. Also it is difficult to establish contact with a solid electrolyte in SSBs, resulting in a poorer performance.

A typical precursor of a monolithic N(M)C is a mixed transition metal (N(M)C) hydroxide, oxy-hydroxide, carbonate, oxide, etc. The hydroxide and oxy-hydroxides have the general formula $Ni_zMn_yCo_xA_aO_v(OH)_w$, wherein $0 \leq v \leq 1$ and $v+w=2$, or $Ni_zMn_yCo_xA_a(OH_b)_2$, with $0.10 \leq z \leq 1.00$, $0 \leq y < 1.00$, $0 < x < 1.00$, $0 \leq a \leq 0.20$, $x+y+z+a=1$, $0.5 \leq b \leq 1$ and A being a dopant. These precursors might already have a monolithic shape. However, typically they are polycrystalline materials.

Generally, the synthesis conditions of a powder influence the morphology of the final N(M)C powder. Producing monolithic materials from precursors having a polycrystalline structure, requires an optimization of synthesis parameters such as sintering temperature, sintering time, and molar ratio of Li to M' (Li/M' hereafter), where M' is the sum of Ni, Co, Mn, and Al in $Li_{1+a}M'_{1-a}O_2$. Obtaining a monolithic morphology is promoted by a high sintering temperature and a large Li excess (high Li/M'). However, if Li/M' is too high, the electrochemical performance deteriorates and secondary phases such as lithium carbonate and lithium hydroxide may be formed, which is not desired, as it may result in a swelling of batteries. A Li/M' ratio close to 1.0 or slightly less than 1.0 is preferred to obtain a desired electrochemical performance in layered positive electrode materials, although the optimized Li/M' is also depending on the composition of M. For example, the optimized Li/M' of $Li_{1+a}(Ni_{0.6}Mn_{0.2}Co_{0.2})_{1-a}O_2$ is around 1.00, while that of $Li_{1+a}(Ni_{0.80}Mn_{0.10}Co_{0.10})_{1-a}O_2$ is around 0.99. In case of $Li_{1+a}(Ni_{0.9}Co_{0.1})_{1-a}O_2$, it has the Li/M' ratio of around 0.98. The electrochemical properties of N(M)Cs deteriorate when Li/M' is higher or lower than this optimized Li/M'.

The N(M)C powders may be manufactured using a conventional direct sintering process, which is a solid state reaction between a lithium source, usually $Li_2CO_3$ or $LiOH.H_2O$, and the precursors described above. First, the lithium source and the mixed transition metal source are homogeneously blended and then sintered. At this step, the ratio of Li/M' in LiM'$O_2$ is the final target composition. To further improve the quality of N(M)C coupled to a high throughput, a double sintering process may be performed. First, the mixed transition metal source is blended with a lithium source and then sintered. At this step, the mixture has the ratio of Li/M' in LiM'$O_2$ between 0.60 and <1.00. Then, in the $2^{nd}$ sintering, the lithium deficient sintered precursor is mixed with a lithium source in order to correct the ratio of Li/M' to the final target composition.

When polycrystalline material is prepared, after the (final) sintering, the sintered cake is crushed, classified and sieved so as to obtain a non-agglomerated N(M)C powder. For obtaining a purely monolithic material however, a dedicated milling process of the positive electrode materials is more adapted, since it separates eventual secondary or agglomerated particles in solitary primary particles. A ball milling process with water is a preferred milling process for a monolithic N(M)C powder, and is a scalable process as well. The degree of milling can be mainly controlled by the amount of balls, the size of a ball, the size of the vessel, the rotating speed (RPM), and milling time.

Surface modification such as a coating on the surface of positive electrode materials is a known strategy to suppress side reactions between the electrode materials and the electrolytes that can lead to poor electrochemical performance during the cycling. Surface coatings may also enhance the structural stability of positive electrode materials, resulting in excellent battery performance. For example, coating materials such as metal oxides ($ZrO_2$, $SiO_2$, ZnO, $Al_2O_3$, $TiO_2$, $WO_3$ etc.) improve the battery properties even at high voltage or when cycling at elevated temperatures. Rough surface coatings may be formed by mechanically mixing positive electrode materials with a coating precursor, followed by a heat treatment of the mixture. However, this may lead to many bare areas on the surface of the electrode material particles, due to a localized formation of the coating layer. These uncoated areas remain weak sites to be attacked by electrolytes, which can lead to side reactions. Alternatively, a core-shell type approach can be adopted by the continuous deposition of coating materials on the surface of the positive electrode material particles. For example, a core-shell positive electrode material can be composed of a $Li(Ni_{0.8}Co_{0.1}Mn_{0.1})O_2$ core with a high capacity and a $Li(Ni_{0.5}Mn_{0.5})O_2$ shell with an excellent thermal stability, as is disclosed in J. Am. Chem. Soc., 2005, 127 (38), pp 13411-13418. Core-shell positive electrode material may thus show superior cycling stability and thermal stability.

Monolithic positive electrode materials can be further improved by applying certain Co based coatings, which we will refer to as "Co-(concentration) gradient" coatings. Providing a concentration gradient for the shell or the entire particle in fact constitutes a good approach to improve the electrochemical properties of positive electrode materials. Generally, positive electrode materials with a concentration gradient from the surface to the center can be obtained by using a metal precursor with a concentration gradient that is produced by a dedicated co-precipitation process. US 2013/0202966A1 describes a positive electrode active material having a concentration gradient layer using a batch reactor for co-precipitation. The positive electrode material has a prolonged lifespan and improved thermal stability. The heating process of the surface coated positive electrode powder is another typical method to obtain a concentration gradient by facilitating the decomposition of a coating source and forming the gradient.

The general coating process may proceed as follows:

Step 1) Coating of a Co precursor on the monolithic positive electrode material, where there is no limitation for the nature of the Co precursor. For example, Co precursors can be either one of $CoSO_4$, $Co(NO_3)_2$, $CoO_x$, $Co(OH)_2$, $CoCO_3$ and $LiCoO_2$. The process for coating the Co can be either a wet or a dry process. To control the Li/M stoichiometry of the final product—as discussed above—a Li source such like $Li_2CO_3$, $LiOH.H_2O$ or $LiNO_3$ may be added during the coating process.

Step 2) Heat treatment allowing Co to react with Li and to diffuse from the surface to the core, resulting in at least a surface layer enriched with Co. The inventors observed that the electrochemical properties of monolithic positive electrode materials such as discharge capacity, rate capability and cycle stability can be improved when there is a specific Co concentration gradient in the electrode particle, especially when the gradient is continuous. The selection of temperature for the heat treatment is a key parameter because it determines the degree of the gradient of Co in a particle. The degree of gradient of Co can be analyzed by an EDS (or WDS) analysis on a cross-section of the particle, whereby an EDS scanning time per analysis point of at least 1 minute is employed. When Mn is present, the Co/Mn (mol/mol) ratio is considered as a criterion to define the degree of the gradient.

It may further be beneficial to apply other surface treatments on the N(M)C materials having a Co-gradient coating. For example, WO2016/116862 discloses a surface treatment providing a surface layer consisting of an intimate mixture of the metal elements of the N(M)C materials and either one or more compounds from the group consisting of $Al_2O_3$, $TiO_2$, MgO, $WO_3$, $ZrO_2$, $Cr_2O_3$ and $V_2O_5$. In a particular embodiment, the surface layer comprises an intimate mixture of elements of the core, LiF and nanometric crystalline $Al_2O_3$, which treatment allows to increase the charging voltage without deteriorating performance, and thus allowing to achieve a higher energy density. As is discussed in WO2015/128722, the decomposition of soluble surface base compounds, which directly influences the battery performance, can be further enhanced by applying a surface treatment with $Na_2S_2O_8$. As an example, the $Na_2S_2O_8$ treatment could be combined with $AlF_3$ (or $Li_3AlF_6$), $AlPO_4$, $Al(OH)_2$ or $Al_2O_3$ treatment. Both the fluorides, the phosphates, the oxide and the hydroxide are lithium acceptors, which can help to decompose the soluble base and at the same time create an oxide $Al_2O_3$ or $LiAlO_2$ surface film.

A positive electrode material is provided, which has excellent electrochemical properties due to the synergistic effect between its monolithic morphology and the special gradient of Co in the electrode particle, eventually supplemented by other dedicated surface coatings or treatments.

The following analysis methods are used in the Examples:

A) SEM and EDS Analysis

A1) SEM Analysis

A morphology of a material, cross section of positive electrodes, and cross section of positive electrode materials are analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. The images of samples are recorded with magnification of (at least) 5000 times to demonstrate the monolithic structure of the materials.

A2) Cross-Section Preparation

Cross-sections of either positive electrodes or positive electrode material are prepared by an ion beam cross-section polisher (CP) instrument, which is a JEOL (IB-0920CP). The instrument uses argon gas as beam source.

The positive electrodes are prepared by following the procedure described below in E1). The electrodes are cut before and after cycling as described in method E2). The electrodes are attached onto an aluminum foil. Later, the foil is attached to the sample holder and placed in the instrument. In a standard procedure, the voltage is set as 6.5 kV with a duration of 3.5 hours duration. A small amount of a positive electrode material powder is mixed with a resin and hardener, then the mixture is heated for 10 minutes on a hot plate. After heating, it is placed into the ion beam instrument for cutting and the settings are adjusted in a standard procedure, with a voltage of 6.5 kV for a 3 hours duration. The cross-section of positive electrode materials is analyzed by method A1).

A3) EDS Analysis

Using the samples prepared in method A2), the concentration gradient from the surface to the center of the positive electrode material particles is analyzed by SEM and energy-dispersive X-ray spectroscopy (EDS). The SEM/EDS is performed on a JEOL JSM 7100F SEM equipment with a 50 $mm^2$ X-Max$^N$ EDS sensor from Oxford instruments. An EDS analysis of the positive electrode material particles provides the quantitative element analysis of the cross-section. In the cross-section EDS, it is assumed that particles are spherical. A straight line is set from the center point to the surface of a particle, and the center point is set as 'D0' and the surface point is set as 'D4'. By setting the additional three points, which are 'D1', 'D2', and 'D3', between the center (D0) and the surface (D4), 5 points are investigated by EDS analysis with a scanning time of 1 min. (see Figure 6.2).

B) PSD Analysis

The PSD is measured using a Malvern Mastersizer 3000 with Hydro MV wet dispersion accessory, after dispersing the powder in an aqueous medium. In order to improve the dispersion of the powder, sufficient ultrasonic irradiation and stirring is applied, and an appropriate surfactant is introduced. D10, D50, and D90 are defined as the particle size at 10%, 50%, and 90% of the cumulative volume % distribution.

C) X-Ray Diffraction Measurement

X-ray diffraction of the positive electrode material is measured using a Rigaku X-Ray Diffractometer (Ultima IV). The measurement is carried out using a Cu-Kα radiation source in a range of diffraction angle (2θ) from 5 to 90° to collect an X-ray diffraction patterns. The scan speed is set at continuous scanning at 1° per minute with the step-size of 0.02° per scans.

The value v and w in $Ni_zMn_yCo_xA_aO_v(OH)_w$, wherein $0 \leq v \leq 1$ and $v+w=2$, can be obtained by a Rietveld refinement technique from the obtained XRD pattern. TOPAS is used as a software for the Rietveld refinement. The Rietveld refinement provides the lattice parameters such as lattice a and lattice c of $Ni_zMn_yCo_xA_aO_v(OH)_w$ which space group is P-3m1. As the value v in $Ni_zMn_yCo_xA_aO_v(OH)$ increases from 0 to 1, lattice a linearly decreases. For example, $Ni_zMn_yCo_xA_a(OH)_2$ (when v=0 and w=2) has lattice a of 3.18 Å while $Ni_zMn_yCo_xA_aOOH$ (when v=1 and w=1) has a=2.85 Å. Therefore, in this case, the following formula can be used to obtain the value v:

$$v = -3.03 \times \text{lattice } a + 9.64$$

D) ICP Analysis

The Li, Ni, Mn and Co contents of the electrode active material are measured with the Inductively Coupled Plasma (ICP) method by using an Agillent ICP 720-ES. 2 g of product powder sample is dissolved into 10 ml high purity hydrochloric acid in an Erlenmeyer flask. The flask can be covered with glass and heated on a hot plate for complete dissolution of the precursor. After being cooled to the room temperature, the solution is moved to a 100 mL volumetric flask with 3-4 times of rinsing the flask using distilled (DI) water. Afterwards, the volumetric flask is filled with DI water up to the 100 mL mark, followed by complete homogenization. 5 ml solution is taken out by a 5 ml pipette and transferred into a 50 ml volumetric flask for a $2^{nd}$ dilution, where the volumetric flask is filled with 10% hydrochloric acid up to the 50 ml mark and then homogenized. Finally, this 50 ml solution is used for ICP measurement.

E) Coin Cell Testing

E1) Coin Cell Preparation

For the preparation of a positive electrode, a slurry that contains electrochemical active material, conductor (Super P, Timcal), binder (KF #9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with a 230 μm gap. The slurry coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1M $LiPF_6$ in EC/DMC (1:2) is used as electrolyte and is dropped between separator and electrodes. Then, the coin cell is completely sealed to prevent leakage of the electrolyte.

E2) Testing Method 1

Each cell is cycled to high voltage (4.7V) at 50° C. in Neware computer-controlled galvanostatic cycling stations.

The coin cell testing schedule uses a 1 C current definition of 160 mA/g. Table 1 shows the coin cell test schedule.

TABLE 1

Cycling schedule for coin cell testing method 1

| | | Charge | | | | Discharge | | |
|---|---|---|---|---|---|---|---|---|
| Cycle No | C Rate | End current | Rest (min) | V/Li metal (V) | C Rate | End current | Rest (min) | V/Li metal (V) |
| 1 | 0.10 | — | 30 | 4.7 | 0.10 | — | 30 | 3.0 |
| 2-51 | 0.50 | 0.1 C | 10 | 4.7 | 1.00 | — | 10 | 3.0 |
| 52 | 0.10 | — | 30 | 4.7 | 0.10 | — | 30 | 3.0 |

E3) Testing Method 2

Method 2 is a conventional "constant cut-off voltage" test. The conventional coin cell test in the present invention follows the schedule shown in Table 2. Each cell is cycled at 25° C. using a Toscat-3100 computer-controlled galvanostatic cycling station (from Toyo). The coin cell testing procedure uses a 1 C current definition of 160 mA/g and comprises two parts as follows: Part I is the evaluation of rate performance at 0.1 C, 0.2 C, 0.5 C, 1 C, 2 C, and 3 C in the 4.3-3.0V/Li metal window range. With the exception of the 1$^{st}$ cycle where the initial charge capacity (CQ1) and discharge capacity (DQ1) are measured in constant current mode (CC), all subsequent cycles feature a constant current-constant voltage during the charge with an end current criterion of 0.05 C. A rest time of 30 minutes for the first cycle and 10 minutes for all subsequent cycles is allowed between each charge and discharge.

The irreversible capacity $Q_{Irr.}$ is expressed in % as follows:

$$Q_{Irr.} = \frac{(CQ1 - DQ1)}{CQ1} \times 100 (\%)$$

The rate performance at 0.2 C, 0.5 C, 1 C, 2 C, and 3 C is expressed as the ratio between the retained discharge capacity DQn, with n=2, 3, 4, 5, and 6 for respectively nC=0.2 C, 0.5 C, 1 C, 2 C, and 3 C as follows:

$$nC - \text{rate} = \frac{DQn}{DQ1} \times 100 (\%)$$

For example, $$3C - \text{rate (in \%)} = \frac{DQ6}{DQ1} \times 100.$$

Part II is the evaluation of cycle life at 1 C. The charge cut-off voltage is set at 4.5V/Li metal. The discharge capacity at 4.5V/Li metal is measured at 0.1 C at cycles 7 and 34 and 1 C at cycles 8 and 35. Capacity fading at 1 C is calculated as follows and is expressed in % per 100 cycles:

$$1C \; QFad. = \left(1 - \frac{DQ35}{DQ8}\right) \times \frac{10000}{27} \; \text{in} \; \frac{\%}{100} \; \text{cycles}$$

TABLE 2

Cycling schedule for Coin cell testing method 2

| | | | Charge | | | | Discharge | | |
|---|---|---|---|---|---|---|---|---|---|
| Type | Cycle No | C Rate | End current | Rest (min) | V/Li metal (V) | C Rate | End current | Rest (min) | V/Li metal (V) |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II | 7 | 0.25 | 0.1 C | 10 | 4.5 | 0.10 | — | 10 | 3.0 |
| | 8 | 0.25 | 0.1 C | 10 | 4.5 | 1.00 | — | 10 | 3.0 |
| | 9~33 | 0.50 | 0.1 C | 10 | 4.5 | 1.00 | — | 10 | 3.0 |
| | 34 | 0.25 | 0.1 C | 10 | 4.5 | 0.10 | — | 10 | 3.0 |
| | 35 | 0.25 | 0.1 C | 10 | 4.5 | 1.00 | — | 10 | 3.0 |

The invention is further exemplified in the following examples:

Explanatory Example 1

This example illustrates that N(M)C products suffer from a large volume change during charge/discharge cycles at high voltage and elevated temperature, and its consequences.

A monolithic N(M)C powder labeled EEX1.1, having the formula $Li_{1+a}(Ni_{0.47}Mn_{0.38}Co_{0.15})_{1-a}O_2$ doped with around 0.28% Ba (in weight), where (1+a)/(1−a) represents the ratio Li/M', was prepared by the following procedure:

1) Preparation of a precursor of NMC: a mixed transition metal hydroxide $M'O_{0.71}(OH)_{1.29}$ (wherein $M'=Ni_{0.47}Mn_{0.38}Co_{0.15}$) was produced by a conventional co-precipitation process using a continuous stirred tank reactor (CSTR) with mixed nickel-manganese-cobalt sulfates ($M'SO_4$), sodium hydroxide (NaOH), and ammonium hydroxide ($NH_4OH$).

2) Blending: The mixed transition metal hydroxide was blended with $Li_2CO_3$ (from Rockwood) as a lithium source and barium carbonate ($BaCO_3$) (Reagent Duksan, 99.9%), with a target Li/M' ratio of 1.07 and a Ba/M' ratio of 0.2 mol %, through a dry blending method in a tubular mixer for a couple of hours.

3) Sintering: The mixture from step 2) was sintered at 1020° C. under dry air atmosphere for 10 hours in a chamber furnace.

4) Post treatment: The sintered product was grinded to avoid the formation of agglomerates. A polycrystalline NMC powder $Li_{1+a}(Ni_{0.47}Mn_{0.38}Co_{0.15})_{1-a}O_2$, where Li/M' was 1.07, was prepared following the same procedure of EEX1.1, without $BaCO_3$ additive, and with a sintering temperature of 925° C. The obtained product was labeled as EEX1.2. The monolithic NMC powder (EEX1.1) had a D50 of 6.96 µm as determined by method B).

A positive electrode was prepared with a) monolithic NMC (EEX1.1) and b) polycrystalline NMC (EEX1.2) as described in method E1). The fresh electrodes were labeled EEX1.1-FE and EEX1.2-FE, respectively. The cycled electrodes were prepared following the procedure in method E2) and were labelled EEX1.1-CE and EEX1.2-CE, respectively. A cross-section of these four electrodes or electrode materials was analyzed as described in methods A2) and A1).

FIG. 1 shows the discharge capacities (y axis—mAh/g) of EEX1.1 and EEX1.2 as a function of cycle number (x axis—#) where the y axis is the discharge capacity. The testing method E2) was very tough because of the high upper cut off voltage (4.7V), the elevated temperature (50° C.) and the fast charge/discharge rate (0.5 C charge/1.0 C discharge). It was confirmed that the monolithic NMC (EEX1.1) had a good cycling stability even in these severe conditions while the polycrystalline NMC (EEX1.2) had an issue as from the $26^{th}$ cycle, resulting in significant capacity fading.

Figure 2:
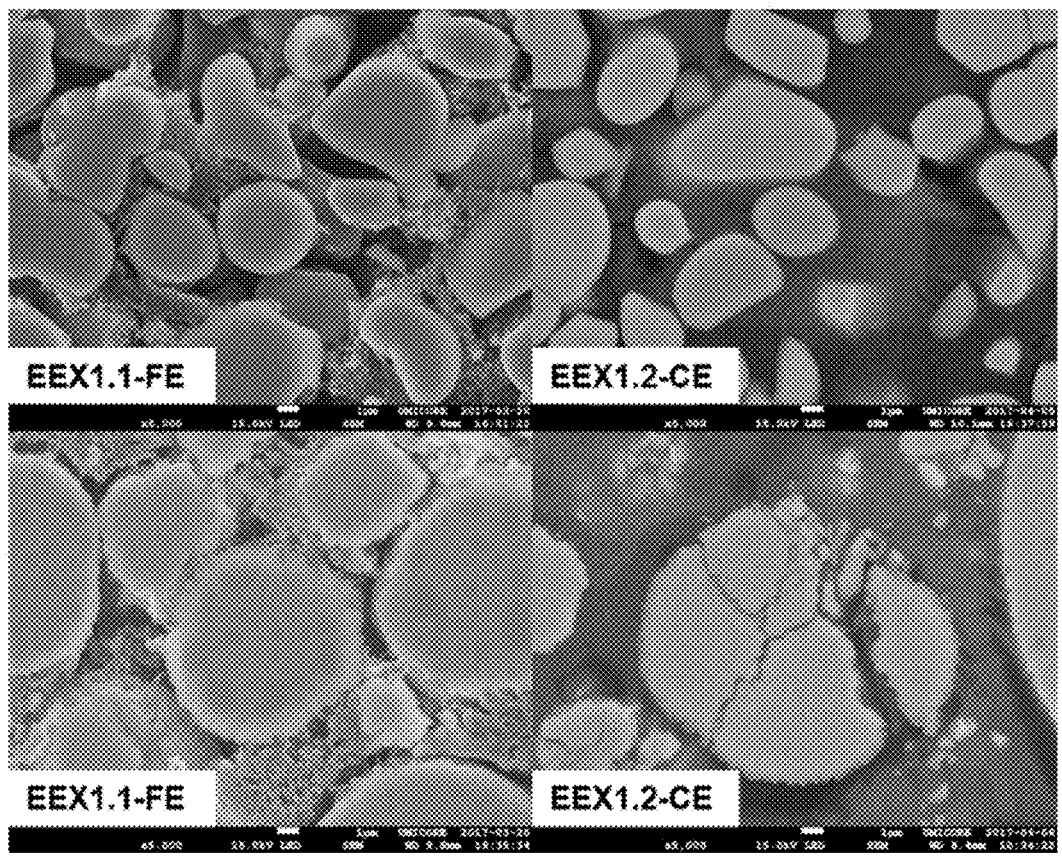
FIG. 2. Cross-sectional SEM images of EEX1.1 and EEX1.2 before and after cycling, FIG. 3. SEM image of EX2 C, FIG. 4. Discharge capacity (DQ1) in Example 2 and Example 3, FIG. 5. Cross-sectional SEM image of EX2 C, with selected positions (D0, D1, D2, D3, and D4) for EDS analysis, FIG. 6. EDS profiles of the Co/Mn molar ratio (mol/mol) of EX2 C at selected positions, FIG. 7. EDS profile of Zr/M' molar rato (mol/mol) of EX3 at selected position.
Figure 3:
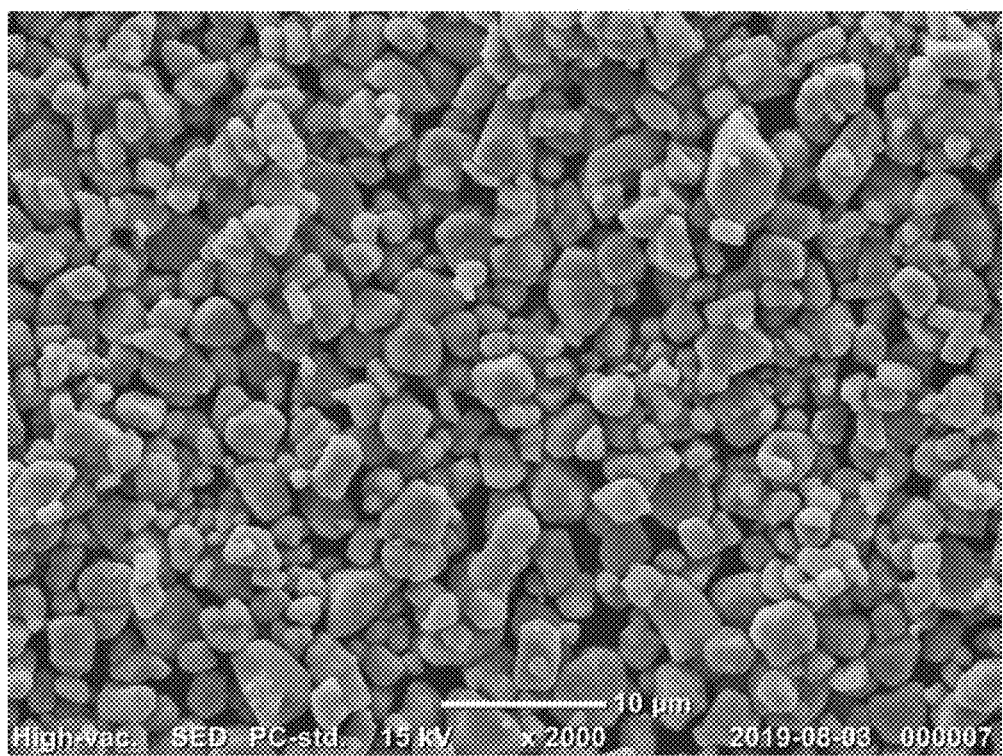

FIG. 2 presents the cross-sectional images of EEX1.1-FE, EEX1.1-CE, EEX1.2-FE and EEX1.2-CE. It was clearly observed that the polycrystalline NMC in the electrode (EEX1.2-CE) had many macro- and micro-cracks after cycling at 4.7V, while the cycled monolithic NMC had no micro-cracks. Therefore, it was shown that the monolithic NMC can endure the volume change much better than the polycrystalline NMC, resulting in the improved cycling stability.

Explanatory Example 2

This example shows the electrochemical property of monolithic NMC bearing different coating elements. The monolithic NMC powder EEX1.1 was stirred with 13 ml of 5 mol % $Co(NO_3)_2.6H_2O$ solution (compared to the amount of M) and 2 ml of water for a couple of hours at 180° C. in a 250 ml beaker. After that, the prepared blend was heated for 5 hours at 850° C. under dry air atmosphere in a chamber furnace. The product was Co-gradient coated monolithic NMC, having the formula $Li_{1+a}(Ni_{0.448}Mn_{0.362}Co_{0.190})_{1-a}O_2$, where Li/M' was 1.02, and was labeled EEX2.1. EEX2.2 was prepared according to the same method as in EEX2.1, except that the coating source was $Mn_{0.5}Co_{0.5}(NO_3)_2$. EEX2.3 was also prepared according to the same method as in EEX2.1, with $Mn(NO_3)_2.6H_2O$ as coating source.

To evaluate the obtained products in a positive electrode for lithium ion batteries, coin cells were prepared by method E1), and tested with method E3). The initial discharge capacity, irreversibility, rate capability and capacity fading of EEX1.1, EEX2.1, EEX2.2 and EEX2.3 are shown in Table 3.

TABLE 3

Electrochemical properties of Explanatory Example 2

| Example ID | DQ1 (mAh/g) | $Q_{Irr.}$ (%) | 3C (%) | 1C Qfad. (%) |
|---|---|---|---|---|
| EEX1.1 | 156.3 | 15.1 | 77.4 | 57.6 |
| EEX2.1 | 160.6 | 10.9 | 82.6 | 39.2 |
| EEX2.2 | 153.2 | 15.0 | 77.1 | 50.6 |
| EEX2.3 | 135.3 | 22.7 | 62.5 | 64.0 |

Co-gradient coated positive electrode material (EEX2.1) had a higher initial discharge capacity, lower irreversibility, better rate performance, and more enhanced cycling stability than EEX1.1, EEX2.2, and EEX2.3.

Example 1

A monolithic NC powder, having the formula $Li_{1+a}(Ni_{0.9}Co_{0.1})_{1-a}O_2$, where Li/M' was 0.97 (a=−0.015), was obtained through a process including two separate sintering steps described as follows:

1) $1^{st}$ blending: to obtain a lithium deficient sintered precursor, $LiOH.H_2O$ and a mixed transition metal source were homogenously blended so as to obtain a first blend having a Li/M' ratio of 0.90.

2) $1^{st}$ sintering: the first blend from the $1^{st}$ blending step was sintered at 700° C. for 10 hours under an oxygen atmosphere so as to obtain a sintered cake. After the $1^{st}$ sintering, the sintered cake was crushed, classified and sieved so as to prepare it for the $2^{nd}$ blending step. The product obtained from this step was a lithium deficient sintered precursor powder, meaning that the Li/M' stoichiometric ratio in $LiM'O_2$ was less than 1.0.

3) $2^{nd}$ blending: the lithium deficient sintered precursor powder was then blended with $LiOH.H_2O$ in order to obtain a second blend having a Li stoichiometry adjusted up to Li/M'=0.97.

4) $2^{nd}$ sintering: the $2^{nd}$ blend from the $2^{nd}$ blending step was sintered at 850° C. for 12 hours under an oxygen atmosphere so as to obtain a sintered material.

5) Wet ball milling: this treatment was applied to break the agglomerated NMC powder from the sintered material resulting from the $2^{nd}$ sintering step into separate particles using water as a solvent (powder:water=1:1 by weight) and 10.0 mm $ZrO_2$ balls under 50 RPM (Rotation Per Minute) for 15 hours in a ball milling equipment so as to obtain a deagglomerated NMC powder. After the milling process, the deagglomerated NMC powder was filtered, dried, and labeled CEX. CEX1 had a median particle size (D50) included in a range from 3.0 to 5.0 µm.

CEX1 is not according to the present invention.

CEX1 was blended with 5 mol % $Co(NO_3)_2.6H_2O$ as a Co coating source, and 5.5 mol % $LiOH.H_2O$ as a lithium source with respect to the total molar contents of Ni, Mn, and Co in CEX. After that, the prepared blend was heated for 10 hours at about 800° C. in an oxygen containing atmosphere in a chamber furnace. The product was labeled EX1, having the formula $Li_{1+a}(Ni_{0.857}C_{0.143})_{1-a}O_2$, where Li/M' is 0.97 (a=−0.015).

EX1 is according to the present invention.

The electrochemical performance of CEX1 and EX1 was evaluated by method E3). The initial discharge capacity, irreversibility, and capacity fading of CEX1 and EX1 were shown in Table 6.

The EDS analysis as shown in Table 7 indicates EX had a Co concentration gradient from the surface to the center of the NMC particle, wherein the particle surface had a higher Co content than the particle center. EX1 had a C(4)/C(3) of 1.23.

TABLE 6

Electrochemical properties of EX1 and CEX1.

| Example ID | DQ1 (mAh/g) | $Q_{Irr.}$ (%) | 1C Qfad. (%) |
|---|---|---|---|
| CEX1 | 196.3 | 15.6 | 17.8 |
| EX1 | 200.8 | 12.2 | 16.8 |

EX1 having a Co concentration gradient had better electrochemical properties than CEX1.

TABLE 7

EDS result of EX1

| Position | C(x) | EX2C Co/(Ni + Co) |
|---|---|---|
| D0 (core) | C(0) | 0.107 |
| D1 (¾ from the surface) | C(1) | 0.113 |
| D2 (²/₄ from the surface) | C(2) | 0.115 |
| D3 (¼ form the surface) | C(3) | 0.114 |
| D4 (surface) | C(4) | 0.141 |

Example 2

In this example, monolithic NMC powders having a general formula $Li_{1+a}(Ni_{0.4}Mn_{0.07}Co_{0.09})_{1-a}O_2$ were prepared according to below-provided procedure.

1) Pre-heating: to obtain a transition metal oxide precursor, $Ni_{0.6}Mn_{0.7}Co_{0.07}(OH)_2$ was heated at 400° C. for 10 hours in air.

2) $1^{st}$ blending: the transition metal oxide precursor was mixed with $LiOH.H_2O$ in order to prepare a $1^{st}$ blend having a Li/M' molar ratio of 0.96.

3) $1^{st}$ sintering: the $1^{st}$ blend was heated at 920° C. for 10 hours under an oxygen atmosphere so as to obtain a sintered cake. After the $1^{st}$ sintering, the sintered cake was crushed, classified and sieved so as to prepare a $1^{st}$ agglomerated intermediate product.

4) Wet ball milling: this treatment was applied to break the agglomerated particles of the $1^{st}$ agglomerated intermediate product into separate primary particles using water (powder:water=1:1 by weight) and 10 mm $ZrO_2$ balls under 50 RPM for 15 hours in a ball mill equipment. 0.5 mol % $CoSO_4$ with respect to the total molar contents of Ni, Mn, and Co in the $1^{st}$ agglomerated intermediate product was added in the water during the wet ball milling process. The Co treated primary particles were separated from water by a filtering process and dried at 250° C. for 12 hours in order to prepare a $1^{st}$ monolithic product having a Li/M' molar ratio of 0.935 (a=−0.034).

The $1^{st}$ monolithic product had a median particle size (D50) of 4 µm.

5) $2^{nd}$ blending: the $1^{st}$ monolithic product was mixed with a 1.5 mol % $Co(OH)_2$ powder having D50 of 0.80 µm with respect to the total molar contents of Ni, Mn, and Co in the $1^{st}$ monolithic product and different amounts of $LiOH.H_2O$ so as to provide as many as $2^{nd}$ blends as provided in Table 8.

6) $2^{nd}$ sintering: the $2^{nd}$ blends prepared in the $2^{nd}$ blending step were heated at 760° C. for 10 hours in order to obtain $2^{nd}$ agglomerated products. The $2^{nd}$ agglomerated products were crushed, classified, and sieved so as to prepare CEX2A, CEX2B, EX2A, EX2B, EX2 C, EX2D, and CEX2C.

CEX2A, CEX2B, and CEX2C are not according to the present invention while EX2A, EX2B, EX2 C, and EX2D are according to the present invention.

CEX2 was prepared according to the same process as EX2 C except that $CoSO_4$ in the step 4) wet ball milling and $Co(OH)_2$ in the step 5) $2^{nd}$ blending were not added.

CEX2 is not according to present invention.

TABLE 8

The preparation process and the discharge capacity in Example 2 and Example 3

| Example ID | Added Co in step 4) (mol %) | Added Co in step 5) (mol %) | Added Li in step 5) (mol %) | Added Zr in step 5) (mol %) | Li/M' | a | DQ1 (mAh/g) |
|---|---|---|---|---|---|---|---|
| CEX2 | 0.0 | 0.0 | 6.0 | 0.00 | 0.990 | −0.005 | 194.6 |
| CEX2A | 0.5 | 1.5 | 1.5 | 0.00 | 0.930 | −0.036 | 193.5 |
| CEX2B | 0.5 | 1.5 | 3.0 | 0.00 | 0.945 | −0.028 | 196.0 |
| EX2A | 0.5 | 1.5 | 4.5 | 0.00 | 0.960 | −0.020 | 199.7 |
| EX2B | 0.5 | 1.5 | 6.0 | 0.00 | 0.975 | −0.013 | 202.7 |
| EX2C | 0.5 | 1.5 | 7.5 | 0.00 | 0.990 | −0.005 | 199.3 |
| EX2D | 0.5 | 1.5 | 9.0 | 0.00 | 1.005 | 0.002 | 199.0 |
| CEX2C | 0.5 | 1.5 | 10.5 | 0.00 | 1.020 | 0.010 | 193.4 |
| EX3 | 0.5 | 1.5 | 7.5 | 0.25 | 0.990 | −0.005 | 201.7 |

Example 3

A monolithic NMC powder EX3 having a general formula $Li_{1+a}(Ni_{0.84}Mn_{0.07}Zr_{0.0025}Co_{0.09})_{1-a}O_2$ with a Co and Zr gradient from the surface to the core was prepared according to the same process as EX2 C except that 0.25 mol % $ZrO_2$ with respect to the total molar contents of Ni, Mn, and Co in the $1^{st}$ monolithic product was added in the step 5) $2^{nd}$ blending.

EX3 is according to the present invention.

TABLE 9

EDS result of EX2C and EX3

| | EX2C | | EX3 | | |
|---|---|---|---|---|---|
| Position | Co/Mn | CM(x)/CM(0) | Co/Mn | CM(x)/CM(0) | Zr/(Ni + Mn + Co + Zr) |
| D0 (core) | 0.963 | 1.000 | 0.973 | 1.000 | 0.000 |
| D1 (¾ from the surface) | 0.982 | 1.020 | 0.947 | 0.973 | 0.000 |

TABLE 9-continued

EDS result of EX2C and EX3

| | EX2C | | EX3 | | |
|---|---|---|---|---|---|
| Position | Co/Mn | CM(x)/CM(0) | Co/Mn | CM(x)/CM(0) | Zr/(Ni + Mn + Co + Zr) |
| D2 (²⁄₄ from the surface) | 0.984 | 1.022 | 1.055 | 1.845 | 0.003 |
| D3 (¹⁄₄ form the surface) | 1.123 | 1.173 | 1.161 | 1.193 | 0.002 |
| D4 (surface) | 1.431 | 1.486 | 1.291 | 1.327 | 0.007 |

Figure 6:
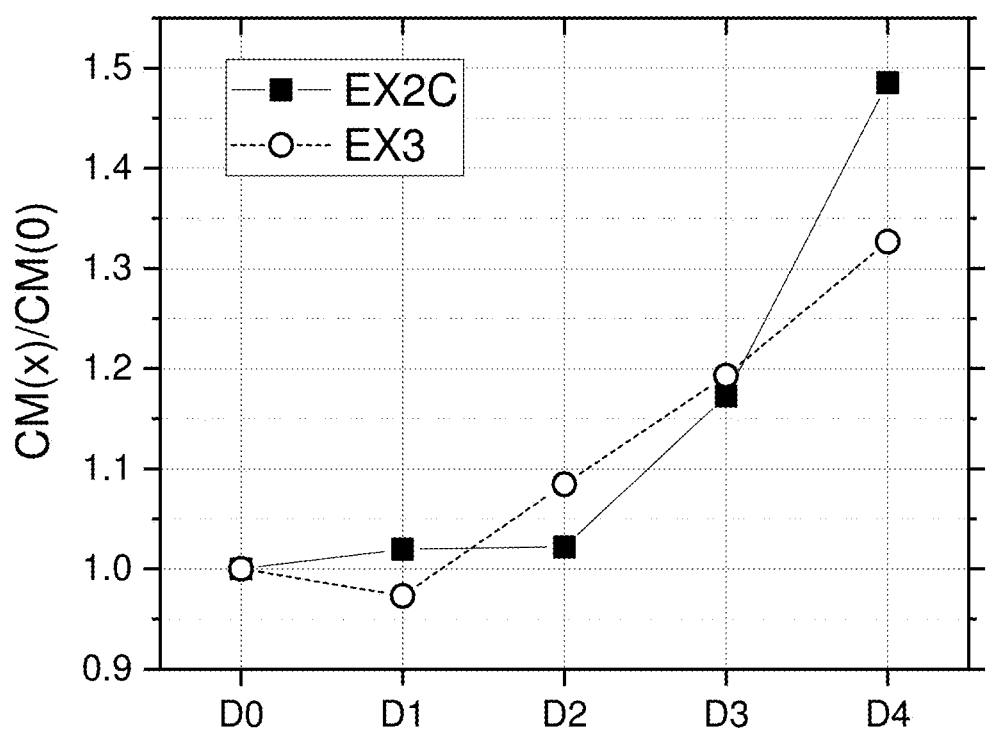
Figure 7:
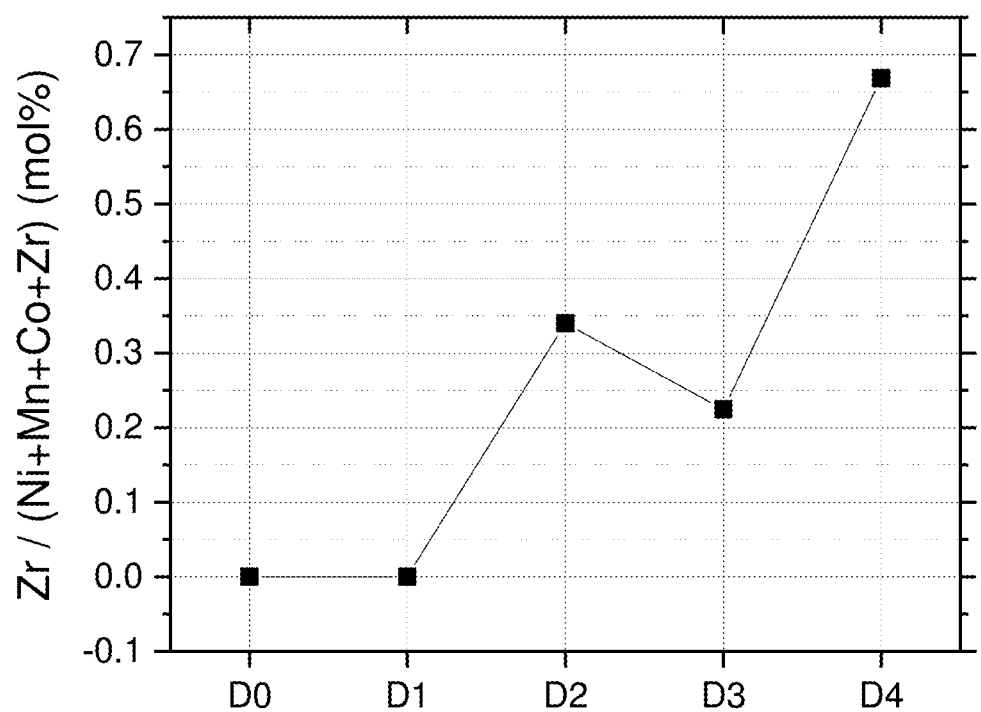

The EDS results provided in Table 9 and depicted in FIG. 6 demonstrate that EX2 C and EX3 has the Co gradient from the surface to the core.

Figure 4:
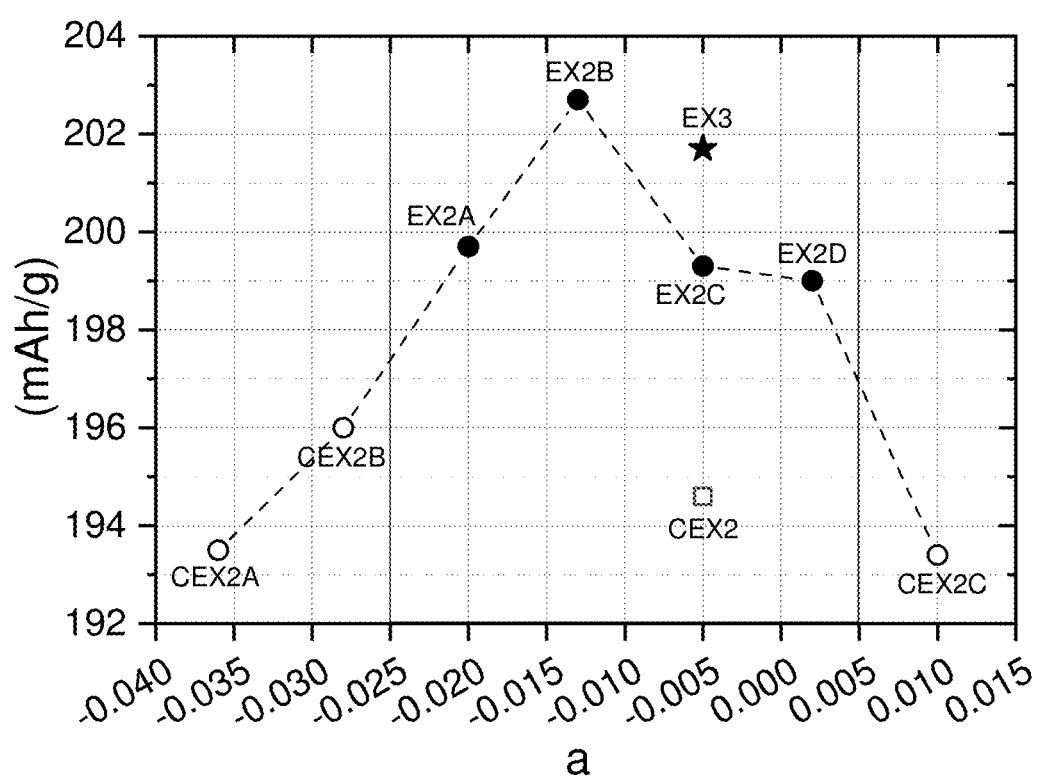
Figure 5:
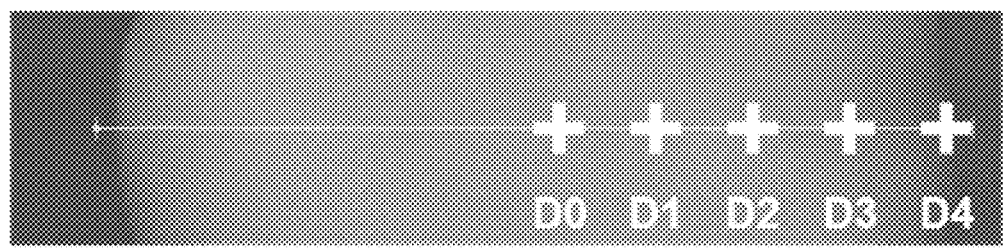

FIG. 4 and Table 6 show that products having a Li/M' molar ratio between 0.960 and 1.005 have superior discharge capacity when they have a Co gradient from the surface to the core (EX2A~EX2D).

When a Co gradient exists together with a Zr gradient from the surface to the core (EX3), higher discharge capacity was observed.

The invention claimed is:

1. A positive electrode active material for a lithium ion battery, comprising a lithium transition metal-based oxide powder, the powder comprising single crystal monolithic particles, said particles having a particle center and a particle surface and comprising Ni and Co and having a general formula $Li_{1+a}(Ni_z Mn_y Co_x Zr_q A_k)_{1-a}O_2$, wherein A is a dopant, $-0.025 \leq a < 0.005$, $0.60 \leq z \leq 0.95$, $y \leq 0.20$, $0.05 \leq x \leq 0.20$, $k \leq 0.20$, $0 < q \leq 0.10$, and $x+y+z+k+q=1$, the particles having a cobalt concentration gradient wherein the particle surface has a higher Co content than the particle center and wherein the particles have a Zr concentration gradient wherein the particle surface has a higher Zr content than the particle center and wherein either when Mn is present, a ratio between a Co/Mn molar ratio at the particle surface and a Co/Mn molar ratio at a distance d from the surface is between 1.1 and 1.4, whereby d=¼ of the distance from the particle surface to the particle center, or when Mn is absent, a ratio between C(4)/C(3) is between 1.1 and 1.4, wherein C(4) is the Co/(Ni+Co) molar ratio at the particle surface and C(3) is the Co/(Ni+Co) molar ratio at a distance d from the surface, whereby either d=¼ or d=¾ of the distance from the particle surface to the particle center.

2. The positive electrode active material of claim 1, wherein the powder has a particle size distribution with D50<10 μm.

3. The positive electrode active material of claim 1, when Mn is present, wherein the ratio between the Co/Mn molar ratio at the particle surface and the Co/Mn molar ratio at the particle center is between 1.4 and 1.5.

4. The positive electrode active material of claim 1, wherein the cobalt concentration gradient varies continuously from the surface to the center of the particles.

5. The positive electrode active material of claim 1, wherein the particles have a morphology with multiple flat surfaces and an aspect ratio of at least 0.8.

6. The positive electrode active material of claim 1, wherein the particles have a surface layer comprising $LiCoO_2$.

7. A solid state lithium ion battery or a lithium ion battery provided with a liquid electrolyte, comprising the powderous positive electrode material of claim 1 being cycled up to a voltage of at least 4.35V.

* * * * *